Patented Mar. 18, 1930

1,751,295

UNITED STATES PATENT OFFICE

ALEXANDER STEWART, OF ROSELLE, NEW JERSEY, ASSIGNOR, BY MESNE ASSIGNMENTS, TO U. S. CHEMICAL PRODUCTS CO., INC., A CORPORATION OF RHODE ISLAND

PRODUCTION OF BASIC LEAD CHROMATE

No Drawing.    Application filed December 9, 1927.    Serial No. 239,007.

The invention relates to the production of basic lead chromate ($PbCrO_4.PbO$) from sulfate compounds of lead, such as substantially pure or purified normal lead sulfate ($PbSO_4$); or basic lead sulfate—"sublimed white lead"—which is composed approximately of 80% lead sulfate, 15% lead oxide, and 5% zinc oxide. Basic lead chromate is of great value as a pigment to the color maker and in the preparation of paints for steel structures and the like; and is composed usually of 55% lead chromate and the remainder as lead oxide ($PbO$).

The invention has for its object to simplify the production of the basic lead chromate or pigment from the sulfates as well as to materially reduce the cost involved in obtaining the product. A further object of the invention resides in the method of production of basic lead chromates of various physical characteristics as, for example, in respect to color and degree of compactness.

I am aware that it has been proposed heretofore to manufacture lead-chromate pigments by treatment of the sulfate with a soluble normal chromate of an alkali metal; or, by treatment with an excess of soluble dichromate of an alkali metal in order to convert substantially all of the lead content to normal chromate and thereafter convert part of the chromate back into the oxide ($PbO$) by treatment with soluble hydrates of an alkali metal, or vice versa. Lead sulfate as obtained by furnacing lead ore has also been treated with an excess of a chromate of an alkali metal or a dichromate thereof; and it has been further proposed to lixiviate lead-containing materials with a saturated solution of a chloride of an alkali-forming metal and precipitate the lead from said solution with water soluble compounds containing the acid radical of chromium.

In contradistinction to the foregoing processes, the novel process forming the subject of this invention contemplates the treatment of lead sulfates in suspension simultaneously with a soluble dichromate of an alkali metal and a soluble hydrate of an alkali metal in an amount of the former, when wholly transformed by the latter to available chromate form, to convert not substantially exceeding 50% of the total lead content to chromate, the hydrate being present, also, in sufficient excess to convert the remainder of the lead to oxide—thus forming a correctly proportioned basic chromate, to wit: $PbCrO_4.PbO$.

In carrying out the process commercially, it is preferred to utilize as the chromate salt the dichromate of sodium and as the hydrate sodium hydrate, both of which are relatively inexpensive; whereas if the normal chromate were utilized, as in the processes and manner heretofore proposed, the cost would be practically doubled. Moreover, a substantial quantity of sodium-sulfate results in applying the novel process to the production of basic lead chromate, which by-product may be used in refining the lead sulfate to be treated, for example, as in the refining process set forth in my prior United States Letters Patents Nos. 1,610,899 and 1,627,351 as well as in my pending application Serial No. 177,463. In conducting the said novel process, the two chromium atoms of the dichromate are converted into the chromate state and thus rendered available for conversion of the desired portion of the lead content into the chromate form, effecting the same result as would be accomplished if the process were carried on initially with the normal chromate in an amount approximately twice that of dichromate required with the novel process and whose market price is practically the same as the chromate.

In effecting the conversion by means, for example, of sodium hydroxide, the same is according to the following equation:

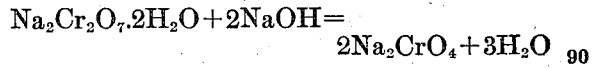
$$Na_2Cr_2O_7.2H_2O + 2NaOH = 2Na_2CrO_4 + 3H_2O$$

from which it may be calculated that one pound of sodium dichromate will yield 1.087 lbs. of chromate as against 0.473 lbs. of chromate in a like weight of sodium chromate having also 10 molecules of water. There is thus a gain in the use of the former of 0.614 lbs. available sodium chromate for combination with the lead of the sulfate employed. In other words, 1 lb. of sodium dichromate ($Na_2Cr_2O_7.2H_2O$) will be as efficient as 2.29 lbs. of sodium chromate ($Na_2CrO_4.10H_2O$).

With the particular reagents noted, the following proportions thereof have been found to give satisfactory results in connection with the conversion of normal lead sulfate to basic lead chromate of the usual commercial composition of 50–55% lead chromate ($PbCrO_4$) and 50–45% lead oxide (PbO).

2000 lbs. of lead sulfate suspended in water;

461 to 508 lbs. of sodium dichromate with 411 to 398 lbs. of sodium hydroxide, depending on the percentage of lead chromate desired. The dichromate and the hydroxide are to be added to the lead sulfate, and the entire solution or mass then heated and slowly agitated for several hours at a temperature of about 70° C. until conversion is complete.

The reactions involved therein are indicated by the following equation:

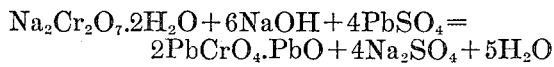

$$Na_2Cr_2O_7.2H_2O + 6NaOH + 4PbSO_4 = 2PbCrO_4.PbO + 4Na_2SO_4 + 5H_2O$$

After conversion is complete, the entire mass is allowed to settle, whereupon the supernatent liquid is siphoned off; and the solid residue is then thoroughly washed with warm water until substantially free from any soluble sodium sulfate. It is thereupon pumped, for example, to a filter, filtered and suitably dried at 120° C. until free from moisture.

This product of lead is of a comparatively light red color; but if a darker red color be desired or a more compact form of the product, the dried basic lead chromate thus obtained is to be roasted in a suitable furnace or the like in an oxidizing atmosphere. The temperatures to which the said product may be exposed will range, in accordance with the final product desired, from 275° C. to 650° C. In the latter case, the heat may be brought up directly to the temperature of 650° C. and the product then allowed to slowly cool. By this procedure, the product may be caused to attain a deep red color and is of a much more compact character than when initially produced. Other physical characteristics as depth of color and structure may be obtained as desired, for example, by holding the temperature of 275° C. for a considerable period of time (24–36 hours); or, exposing the basic lead chromate to various temperatures between 275° C. and 650° C. The closer the temperature to which said product is exposed approximates 650° C., the darker or deeper will be the red color attained thereby, accompanied by the formation, also, of a larger crystal in a shorter heating period and a consequent increase in density.

When working with basic lead sulfate or "sublimed white lead", as obtained by furnacing lead ores, and comprising approximately 80% lead sulfate, 15% lead oxide and 5% zinc oxide, the process hereinbefore described is accordingly varied, particularly in requiring less sodium hydroxide depending upon the composition of lead product, it being understood that the zinc oxide thereof is unaffected by the treatment.

For example, there is added to 2,000 lbs. of basic lead sulfate of the foregoing composition and suspended in water some 451 lbs. of sodium dichromate and 369 lbs. of sodium hydroxide. The entire solution or mass is then suitably heated and slowly agitated for several hours and at a temperature of about 70° C. until conversion is complete. It is thereupon allowed to settle and the liquid portion siphoned off or otherwise removed, the solids being thoroughly washed with warm water and freed from soluble sodium sulfate. The product is then filtered and dried at 120° C. until free from moisture, and provides a very desirable paint product for structural steel, etc. If its physical characteristics are to be altered, for example, as to color and compactness, the procedure hereinbefore described as to roasting the same may be similarly conducted.

I claim:—

1. The method of preparing basic lead chromate from a sulphate compound of lead, which includes the treatment at a temperature not exceeding approximately 70° C. of the lead product simultaneously with a soluble dichromate of an alkali metal and a soluble hydrate of an alkali metal.

2. The method of preparing basic lead chromate from a sulfate compound of lead, which includes the treatment at a temperature not exceeding approximately 70° C. of the lead product simultaneously with a soluble dichromate of an alkali metal and a sufficient quantity of a soluble hydrate of an alkali metal to transform all of the dichromate and afford the required amount of normal chromate for the conversion of the desired proportion of the lead content to chromate.

3. The method of preparing basic lead chromate from a sulfate compound of lead, which includes the treatment at a temperature not exceeding approximately 70° C. of the lead product simultaneously with a soluble dichromate of an alkali metal and a soluble hydrate of an alkali metal sufficient to convert not substantially exceeding 50% of the total lead content to chromate.

4. The method of preparing basic lead chromate from a sulfate compound of lead, which includes the treatment at a temperature not exceeding approximately 70° C. of the lead product simultaneously with a soluble dichromate of an alkali metal and a soluble hydrate of an alkali metal sufficient to convert not substantially exceeding 50% of the total lead content to chromate and the remainder to oxide.

5. The method of preparing basic lead chromate from a sulfate compound of lead, which includes the treatment at a temperature not exceeding approximately 70° C. of the lead product simultaneously with a soluble dichromate of an alkali metal and a soluble hydrate of an alkali metal sufficient to convert the total lead content substantially to 55% of chromate of lead and 45% to oxide of lead (PbO).

6. The method of preparing basic lead chromate from lead sulfate, which comprises suspending 2000 lbs. of the lead sulfate in water, adding from 461 to 508 lbs. of sodium dichromate with 411 to 398 lbs. of sodium hydroxide thereto, heating to approximately 70° C. and agitating until the conversion to basic lead chromate is effected.

7. The method of preparing basic lead chromate from a sulfate compound of lead, which includes the treatment at a temperature not exceeding approximately 70° C. of the lead product simultaneously with sodium dichromate and sodium hydroxide, the amount of the latter being sufficient to render available all of the dichromate as chromate to provide for the conversion of not substantially exceeding 50% of the total lead content to chromate as well as to convert the remainder of the lead to oxide, allowing the basic lead chromate to settle and removing the liquid therefrom, washing the residue with warm water until free from sodium sulfate, filtering, and drying said residue at 120° C.

8. The method of preparing basic lead chromate from a sulfate compound of lead, which includes the treatment at a temperature not exceeding approximately 70° C. of the lead product simultaneously with a soluble dichromate of an alkali metal and a soluble hydrate of an alkali metal sufficient to convert not substantially exceeding 50% of the total lead content to chromate and the remainder to oxide, as well as to neutralize free chromic acid.

In testimony whereof I affix my signature.

ALEXANDER STEWART.